United States Patent
Voicu et al.

(10) Patent No.: US 10,911,238 B2
(45) Date of Patent: Feb. 2, 2021

(54) OFFLINE PROTECTION OF SECRETS

(71) Applicant: Microsoft Technology Licensing, LLC, Redmond, WA (US)

(72) Inventors: Nicolae Voicu, Bellevue, WA (US); Shane Brady, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 228 days.

(21) Appl. No.: 15/592,695

(22) Filed: May 11, 2017

(65) Prior Publication Data
US 2018/0167372 A1    Jun. 14, 2018

Related U.S. Application Data

(60) Provisional application No. 62/434,314, filed on Dec. 14, 2016.

(51) Int. Cl.
*H04L 9/32* (2006.01)
*H04L 29/06* (2006.01)
(Continued)

(52) U.S. Cl.
CPC ............ *H04L 9/3228* (2013.01); *H04L 9/088* (2013.01); *H04L 9/0825* (2013.01);
(Continued)

(58) Field of Classification Search
CPC ..... H04L 63/061; H04L 9/088; H04L 9/0825; H04L 63/0442; H04L 63/083;
(Continued)

(56) References Cited

U.S. PATENT DOCUMENTS 7,849,326 B2    12/2010    Chao
8,788,843 B2    7/2014    Kopasz et al.
(Continued)

FOREIGN PATENT DOCUMENTS

WO    2015135063 A1    9/2015

OTHER PUBLICATIONS

Authorizing a computer to access a web application, http://stackoverflow.com/questions/10990379/authorizing-a-computer-to-access-a-web-application, Retrieved on: Dec. 19, 2016, 3 pages.

*Primary Examiner* — Huan V Doan
(74) *Attorney, Agent, or Firm* — Merchant & Gould P.C.

(57) ABSTRACT

Examples of the present disclosure describe systems and methods relating to the offline protection of secrets. A secret may be encrypted using a public key provided by the client. The client may have obtained the public key from a cryptographic hardware device, wherein the private key of the cryptographic key pair may be bound to the cryptographic hardware device. The encrypted secret may be transmitted by a service to the client using a secured or an unsecured transmission method. In some examples, the service may transmit a subsequent encrypted secret, which may invalidate a previously encrypted secret. In order to authenticate with the service, the client may select an encrypted secret for decryption. The client may access the private key stored by the cryptographic device and decrypt the encrypted secret with the private key. The client may then use the decrypted secret to authenticate with the service.

20 Claims, 9 Drawing Sheets

(51) Int. Cl.
*H04L 9/08* (2006.01)
*H04W 12/06* (2021.01)

(52) U.S. Cl.
CPC ...... *H04L 9/0863* (2013.01); *H04L 29/06789* (2013.01); *H04L 63/0442* (2013.01); *H04L 63/083* (2013.01); *H04L 63/0838* (2013.01); *H04L 9/3234* (2013.01); *H04L 63/0435* (2013.01); *H04L 63/061* (2013.01); *H04W 12/0608* (2019.01)

(58) Field of Classification Search
CPC . H04L 63/0435; H04L 9/3228; H04L 9/0863; H04L 63/0838; H04L 29/06789; H04L 9/3234; H04W 12/0608
See application file for complete search history.

(56) References Cited

U.S. PATENT DOCUMENTS

| | | | |
|---|---|---|---|
| 8,831,214 B2 | 9/2014 | Shaik | |
| 8,997,197 B2 | 3/2015 | Nord et al. | |
| 9,143,318 B1 | 9/2015 | Young | |
| 9,171,145 B2 | 10/2015 | Dash et al. | |
| 9,363,259 B2 | 6/2016 | Chenna | |
| 9,401,911 B2* | 7/2016 | Castelnuovo | H04L 63/0823 |
| 9,455,968 B1 | 9/2016 | Machani et al. | |
| 2009/0104888 A1* | 4/2009 | Cox | G06F 21/31 455/410 |
| 2009/0200371 A1* | 8/2009 | Kean | G06F 21/31 235/379 |
| 2010/0325097 A1* | 12/2010 | Er | G06F 21/629 707/702 |
| 2011/0197266 A1* | 8/2011 | Chu | H04L 9/3228 726/5 |
| 2011/0258452 A1* | 10/2011 | Coulier | G06F 21/31 713/171 |
| 2011/0295753 A1 | 12/2011 | Reno | |
| 2012/0254622 A1 | 10/2012 | Kanungo | |
| 2014/0165167 A1* | 6/2014 | Nunn | G06F 21/45 726/6 |
| 2014/0351589 A1* | 11/2014 | Chenna | H04L 63/0823 713/168 |
| 2015/0134950 A1 | 5/2015 | Colgrove et al. | |
| 2015/0312041 A1* | 10/2015 | Choi | H04L 9/3231 713/175 |
| 2016/0156598 A1* | 6/2016 | Alonso Cebrian | H04L 63/0861 713/168 |

* cited by examiner

OFFLINE PROTECTION OF SECRETS

CROSS-REFERENCE TO RELATED APPLICATION

This application claims priority to U.S. Provisional Application No. 62/434,314, entitled "Offline Protection of Secrets," filed on Dec. 14, 2016, the entire disclosure of which is hereby incorporated by reference in its entirety.

BACKGROUND

In a computing environment, there may be a variety of authentication mechanisms with which a user may gain access to a service and perform administrative tasks. While convenience and security may be offered by certain techniques (e.g., just-in-time privilege escalation, on-demand administrator account generation, etc.), these techniques may not always be available. In an emergency or failure situation, backup techniques may be available that permit authentication even when primary techniques are unavailable. As a result, it may still be possible to authenticate and perform administrative tasks, thereby enabling a user to restore functionality and resolve the emergency situation. However, such backup techniques may require a secret be used for authentication, and the secret must be stored securely in order to avoid potential security vulnerabilities.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to offline protection of secrets. A service may transmit an encrypted secret to a client, wherein the secret may be encrypted using a public key of a cryptographic key pair. The public key may be obtained from a cryptographic hardware device, wherein the private key of the cryptographic key pair may be bound to the cryptographic hardware device.

The encrypted secret may be transmitted using a secured or an unsecured transmission method (e.g., using email, storing the encrypted secret on a network file share, etc.). Since decryption requires the private key, which is stored by a cryptographic hardware device, the encrypted secret need not be transmitted using an encrypted communication channel. In some examples, the service may periodically or occasionally transmit a subsequent encrypted secret, thereby invalidating previously encrypted secrets.

The client may determine that alternate authentication mechanisms are unavailable. As a result, the client may select an encrypted secret for decryption. The client may access the private key stored by the cryptographic device, and use the private key to decrypt the encrypted secret. The client may use the decrypted secret to authenticate with the service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
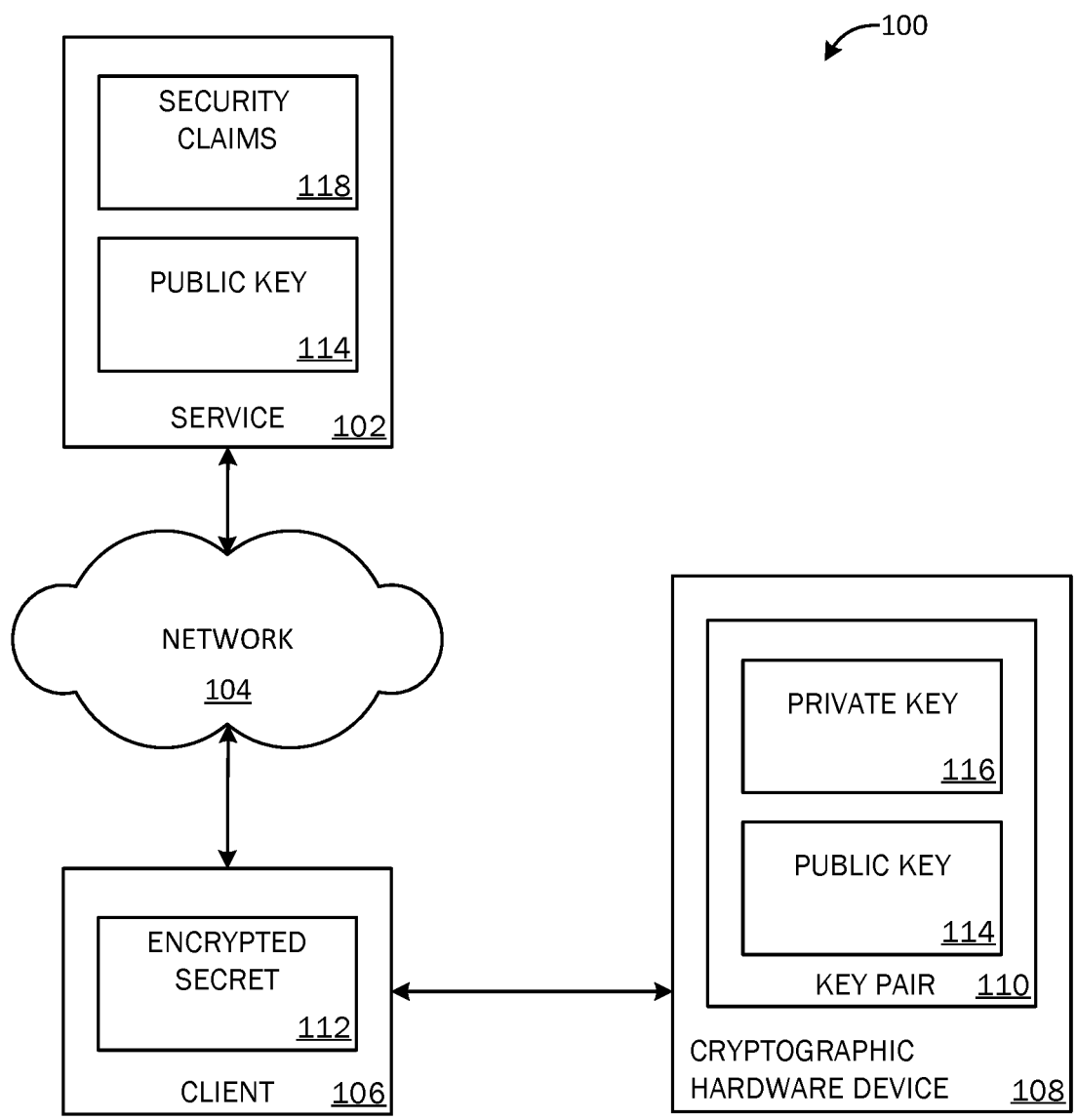
FIG. 1 illustrates an overview of an example system for the offline protection of a secret.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods relating to the offline protection of secrets. A secret may be a password, a cryptographic key, or other type of credential used to perform authentication. The secret may be stored offline for failure recovery or as an offline backup, among other reasons. As an example, it may be important that the secret be accessible in the event of a failure (e.g., a remote resource may be inaccessible or available via reduced or restricted access, certain services typically used for administration may be disabled or otherwise unavailable, etc.) so that the secret may be retrieved and used to resolve the failure. The secret may be used to authenticate with, or gain access to, a service.

The service may be a cloud computing service (e.g., Office365, Google Apps, etc.) or a tenant of a cloud computing platform (e.g., Microsoft Azure, Amazon Web Services, etc.), among others. In examples, the service may be provided by a computing device (e.g., a local computing device, a remotely accessible server device, etc.). The service may be managed using a variety of administration mechanisms, including, but not limited to, just-in-time privilege escalation or on-demand administrator account generation. However, the service may provide a secret to a client that may be used to gain administrative access in addition to or in alternative to such administration mechanisms. In some examples, the secret may be a password to an administrator account or a cryptographic key for secure shell (SSH) access, among others. The client may then use the secret in an emergency or failure situation to gain access to the system or service.

The secret may be encrypted using the public key of a cryptographic key pair. In some examples, the cryptographic key pair may be provided by a client, wherein the client received the public key from a cryptographic hardware device. The cryptographic hardware device may be a hardware security module or smart card, among others. Further, the private key of the cryptographic key pair may reside or be bound to the cryptographic hardware device, such that the private key is accessible only by way of the cryptographic hardware device.

The client may be a computing device, such as a tablet computing device, a mobile computing device, or a laptop or desktop computing device, among others. In one example, the client may be one or more computing devices, wherein one device may perform certain aspects disclosed herein, while another device may perform other aspects. Further, the service may communicate directly with the client (e.g., using a computer network or other communication channel), or may communicate indirectly with the client (e.g., by storing information in a data store or with a service that may then be accessed by the client, among others). In some examples, the one or more computing devices may be used by a user, wherein the one or more computing devices are used by the user to perform aspects disclosed herein.

In another example, the user may be one or more people that interact with or affect the behavior of the client. As an example, the user may be an individual user of the client, or may be a group of people (e.g., a department within an organization, a list of people who have physical access to a cryptographic hardware device, etc.). In another example, the user may be a person having a specific position or job title (e.g., a system administrator, a manager, etc.), among others. As a result, the identity of the user may change depending on the person or people who currently occupy the position or hold the job title.

The user may use the client to register with the service in order to receive the encrypted secret. Registration may comprise providing the public key of a cryptographic key pair received from a cryptographic hardware device to the service, along with security claims from the cryptographic hardware device relating to the private key of the cryptography key pair or the cryptographic hardware device. The security claims may provide information relating to the cryptographic hardware device, including, but not limited to, a firmware version, a hardware version, a software version, a manufacturer, or a serial number. The security claims may also relate to policies associated with the cryptographic key, such as protection mechanisms (e.g., PIN protection, biometric authentication, etc.) or security requirements (e.g., PIN length, PIN expiration period, etc.), among others. In an example, the security claims may be signed using a trusted certificate.

The service may validate the security claims received from the client. Validation may comprise evaluating the received information, such as the firmware version, hardware version, serial number, as well as validating the signature, among others. The security claims may be validated using one or more policies, wherein the policies may specify security requirements that must be satisfied by the cryptographic hardware device or the client. As an example, a policy may specify that the cryptographic hardware device should implement a specific cryptographic algorithm, generate cryptographic keys having a certain length (e.g., 2048-bit, 4096-bit, etc.), or provide biometric protection, among other requirements. In another example, a policy may specify requirements for the client, including, but not limited to, security permissions and password complexity requirements. Once the service has validated the security claims, the service may store the security claims and the public key. The service may also receive and store an indication from the client specifying a transmission mechanism to use when transmitting an encrypted secret.

As an example, the client may provide an email address, a file path on a network file server, or a callback uniform resource locator (URL), among others, that may be used by the service to transmit the encrypted secret. In some examples, the information provided by the client may be associated with or provided by a user of the client. The transmission method need not be secured or encrypted, because the encrypted secret may only be decrypted using the private key stored by the cryptographic hardware device. As such, even if the encrypted secret is transmitted using an unencrypted communication channel, the secret remains secure. One of skill in the art will appreciate that other transmission methods may be used without departing from the spirit of this disclosure.

The service may encrypt a secret and provide it to the newly-registered client. The secret may be a pre-existing secret or may be a newly-generated secret. In some examples, the secret may be a password for a user account, wherein the user account may be created as a result of the user registration operation discussed above. In another example, the secret may be a password for a pre-existing user account. In one example, the service may again validate the stored security claims prior to transmitting the secret to the client. The secret may be encrypted using the stored public key, thereby generating an encrypted secret. The encrypted secret may contain additional information, including metadata or properties. The additional information may comprise identifying information relating to the public key or cryptographic hardware device, including, but not limited to, a key fingerprint, a hash of the key or related information (e.g., MD5, SHA-1, etc.), or an identifier (e.g., a globally unique identifier (GUID), a uniform resource identifier (URI), etc.). The additional information may be used by the client when decrypting the encrypted secret. In another example, the additional information may relate to authentication information, including, but not limited to, account credentials or identifying machine information (e.g., an IP address, a MAC address, a machine hostname, etc.).

Once the encrypted secret has been generated, the service may access the stored information relating to the transmission method indicated by the client. The service may transmit the encrypted secret to the client using the indicated mechanism. As an example, the service may email the encrypted secret to a specified email address, upload the encrypted secret to a specified file path on a network file server, or provide the encrypted secret to the provided callback URL (e.g., using an HTTP POST request), among others.

In some examples, a new secret may be generated periodically or in response to an event (e.g., a new user is added, a previous secret was used to gain access to the service, etc.). The service may transmit the secret to the client, wherein the service may validate stored security claims and transmit the encrypted secret to the client using the transmission method indicated by the client. In some examples, the service may provide an indication to the client that a previous secret has expired or has been invalidated. For example, the service may provide an email notification, may delete old encrypted secrets from a network file server, or may provide an indication using the callback URL specified by the client during registration, among others.

When authenticating using an encrypted secret, the client may select the most recent encrypted secret. In an example, the selected encrypted secret may comprise metadata or properties that provide information relating to the cryptographic key used to encrypt the secret. The client may use this information to determine which cryptographic key or which cryptographic hardware device is required to decrypt the encrypted secret. In some examples, a plurality of computing devices may be used. For example, the encrypted secret may be received by one computing device, while another computing device may be used to select the encrypted secret for decryption. In another example, a further computing device may be used to decrypt the encrypted secret using the private key stored by the cryptographic hardware device. The cryptographic hardware device may be a portable device, such that decryption may occur on any number of computing devices so long as the cryptographic hardware device is present. One of skill in the art will appreciate that any number of computing devices may be used to perform aspects disclosed herein without departing from the spirit of this disclosure.

The client may access a private key from a cryptographic hardware device to decrypt the encrypted secret. In some examples, the client may provide the encrypted secret to the cryptographic hardware device, after which the cryptographic hardware device may provide an unencrypted secret in response. Once the encrypted secret has been decrypted using the private key, the client may use the encrypted secret to gain access to the service. In some examples, the client may refer to information stored within the encrypted secret relating to authentication, such as accessing account credentials or identifying machine information to determine which computing device to access.

FIG. 1 illustrates an overview of an example system 100 for the offline protection of a secret. System 100 is comprised of service 102, network 104, client 106, and cryptographic hardware device 108. Service 102 may be a cloud computing service (e.g., Microsoft Office365, Google Apps, etc.) or a cloud computing platform (e.g., Microsoft Azure, Amazon Web Services, etc.), among others. Service 102 may store security claims 118 and public key 114, both of which may have been received from client 106 when performing a user registration operation as described herein. Client 106 may be a computing device, including, but not limited to, a tablet computer, a mobile computing device, or a laptop or desktop computing device, among others. In some examples, client 106 may be a plurality of computing devices. Client 106 may store encrypted secret 112, which may have been received from service 102. Client 106 may access service 102 via network 104. Client 106 may communicate with cryptographic hardware device 108 when authenticating or performing other cryptographic operations. Cryptographic hardware device 108 may be a hardware security module or a smart card, among others.

Cryptographic hardware device 108 may store key pair 110, which is comprised of public key 114 and private key 116. Private key 116 may be bound to cryptographic hardware device 108, meaning that private key 116 is only accessible to cryptographic hardware device 108. In some examples, cryptographic hardware device may store only private key 116 rather than both public key 114 and private key 116.

When performing a user registration operation, client 106 may communicate with cryptographic hardware device 108 to obtain public key 114. In some examples, client 106 may request that cryptographic hardware device 108 generate a new key pair (e.g., key pair 110). Client 106 may send public key 114 to service 102, along with security claims (not pictured) received from or about cryptographic hardware device 108. The security claims may provide information relating to cryptographic hardware device 108, including, but not limited to, a firmware version, a hardware version, a software version, a manufacturer, or a serial number. The security claims may also relate to policies associated with the cryptographic key, such as protection mechanisms (e.g., PIN protection, biometric authentication, etc.) and security requirements (e.g., PIN length, PIN expiration period, etc.), among others. In an example, the security claims may be signed using a trusted certificate.

After receiving the security claims and public key 114 from client 106, service 102 may validate the received security claims, including, but not limited to, evaluating the firmware version, hardware version, serial number, as well as validating the signature of the security claims. Service 102 may validate the security claims using one or more policies, wherein the policies may specify security requirements that must be satisfied by cryptographic hardware device 108 or client 106. Once service 102 has validated the security claims, service 102 may store the security claims (e.g., as security claims 118) and public key 114. Service 102 may also receive and store an indication (not pictured) from the client specifying a transmission method to use when transmitting an encrypted secret.

As a result of completing the registration operation and periodically or occasionally thereafter, service 102 may send an encrypted secret to client 106. The secret may be pre-existing or newly-generated. Service 102 may encrypt the secret using public key 114, thereby generating an encrypted secret. In an example, the encrypted secret may comprise additional information, including metadata or properties. The additional information may relate to public key 114, to authentication credentials, or the authentication process.

Service 102 may access information relating to the transmission method indicated by client 106. Service 102 may use this information to transmit the encrypted secret to client 106, which client 106 may store as encrypted secret 112. Service 102 may transmit the encrypted secret to client 106 using a secured or unsecured communication technique, including using an email message, a network file transfer protocol, or URL callback, among others. In some examples, service 102 may validate security claims 118 prior to transmitting the secret. In another example, client 106 may comprise a plurality of computing devices, wherein one computing device may be used to receive the encrypted secret, while another computing device may store encrypted secret 112. Similarly, different computing devices comprising client 106 may receive subsequent encrypted keys over time. As an example, client 106 may comprise a distributed computing environment, wherein demand is divided among multiple machines. As such, one encrypted secret transmission may be received by one computing device within the distributed computing environment, while another computing device may receive a later encrypted secret transmission.

A user may use client 106 to access service 102 using encrypted secret 112. In some examples, client 106 may first determine that alternate authentication mechanisms are unavailable. Encrypted secret 112 may comprise metadata or properties at aid client 106 in accessing the private key required to decrypt encrypted secret 112. As an example, the metadata or properties may provide an indication to client 106 that it should communicate with cryptographic hardware device 108 and/or that the requisite private key is a key having the characteristics of private key 116. Client 106 may communicate with cryptographic hardware device 108 to decrypt encrypted secret 112 using private key 116. Once encrypted secret 112 is decrypted, client 106 may use the decrypted secret to access service 102.

Figure 2:
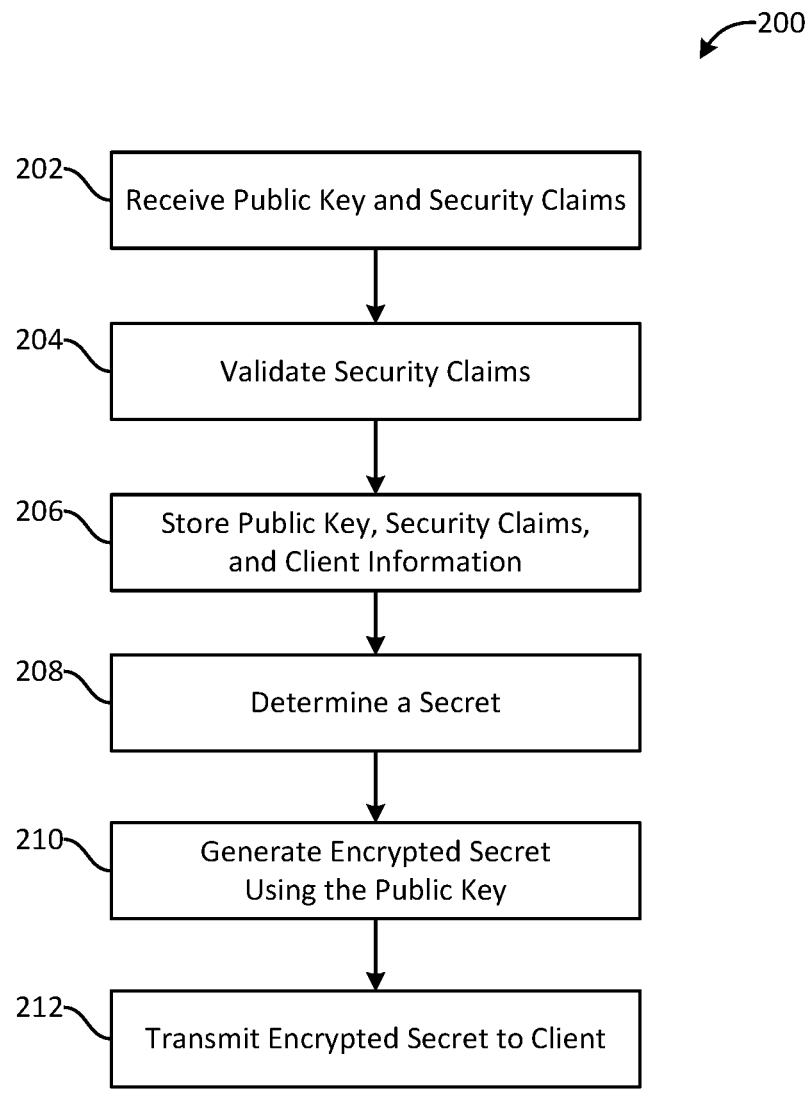
FIG. 2 illustrates an overview of an example method for registering a client for offline protection of secrets.

FIG. 2 illustrates an overview of an example method 200 for registering a user for offline protection of secrets. Method 200 may be performed by a cloud computing service (e.g., service 102 in FIG. 1) or a tenant of a cloud computing platform, among others. Method 200 begins at operation 202, where a public key and security claims may be received. The public key and security claims may be received from a client, such as client 106 in FIG. 1. The public key may be part of a cryptographic key pair, wherein the cryptographic key pair was provided by a cryptographic hardware device (e.g., cryptographic hardware device 108). The cryptographic hardware device may be a hardware security module or a smart card, among others. The security claims may provide information relating to the cryptographic hardware device, including, but not limited to, a firmware version, a hardware version, a software version, a manufacturer, or a serial number. The security claims may also relate to policies associated with the cryptographic key, such as protection mechanisms and security requirements, among others. In an example, the security claims may be signed using a trusted certificate.

Moving to operation 204, the received security claims may be validated. In some examples, validating the security claims may comprise evaluating the received information relating to the cryptographic hardware device, such as the firmware version, hardware version, serial number, as well as validating the signature, among others. The security claims may be evaluated in view of one or more policies. The policies may specify security requirements that must be satisfied by the cryptographic hardware device and/or by the client.

At operation 206, the public key, security claims, and information relating to or provided by the client may be stored. The client information may comprise information that may be used to transmit an encrypted secret to the client, including, but not limited to, an email address, a file path on a network file server, or a callback URL. The public key, security claims, and client information may be stored locally or may be stored by a remote or distributed storage system.

Moving to operation 208, a secret may be determined. In some examples, the secret may be a pre-existing secret. In another example, determining a secret may comprise generating a new secret or requesting a generated secret from another device, application, module, process, etc. At operation 210, an encrypted secret is generated from the determined secret using the public key received from the client. Generating the encrypted secret may comprise storing additional properties or metadata alongside the encrypted representation of the secret. The additional information may comprise identifying information relating to the public key or cryptographic hardware device, including, but not limited to, a key fingerprint, a hash of the key or related information, or an identifier. The additional information may be used by the client when decrypting the encrypted secret. In another example, the additional information may relate to authentication information, such as account credentials or identifying machine information, among others.

At operation 212, the encrypted secret may be transmitted to the client. Transmitting the secret may comprise accessing the client information stored at operation 206 to determine a transmission method. As discussed above, the transmission method may be a secured or unsecured communication channel. As an example, the encrypted secret may be transmitted to a specified email address, uploaded to a specified file path on a network file server, or provided to a callback URL (e.g., using an HTTP POST request), among others. Flow terminates at operation 212.

Figure 3:
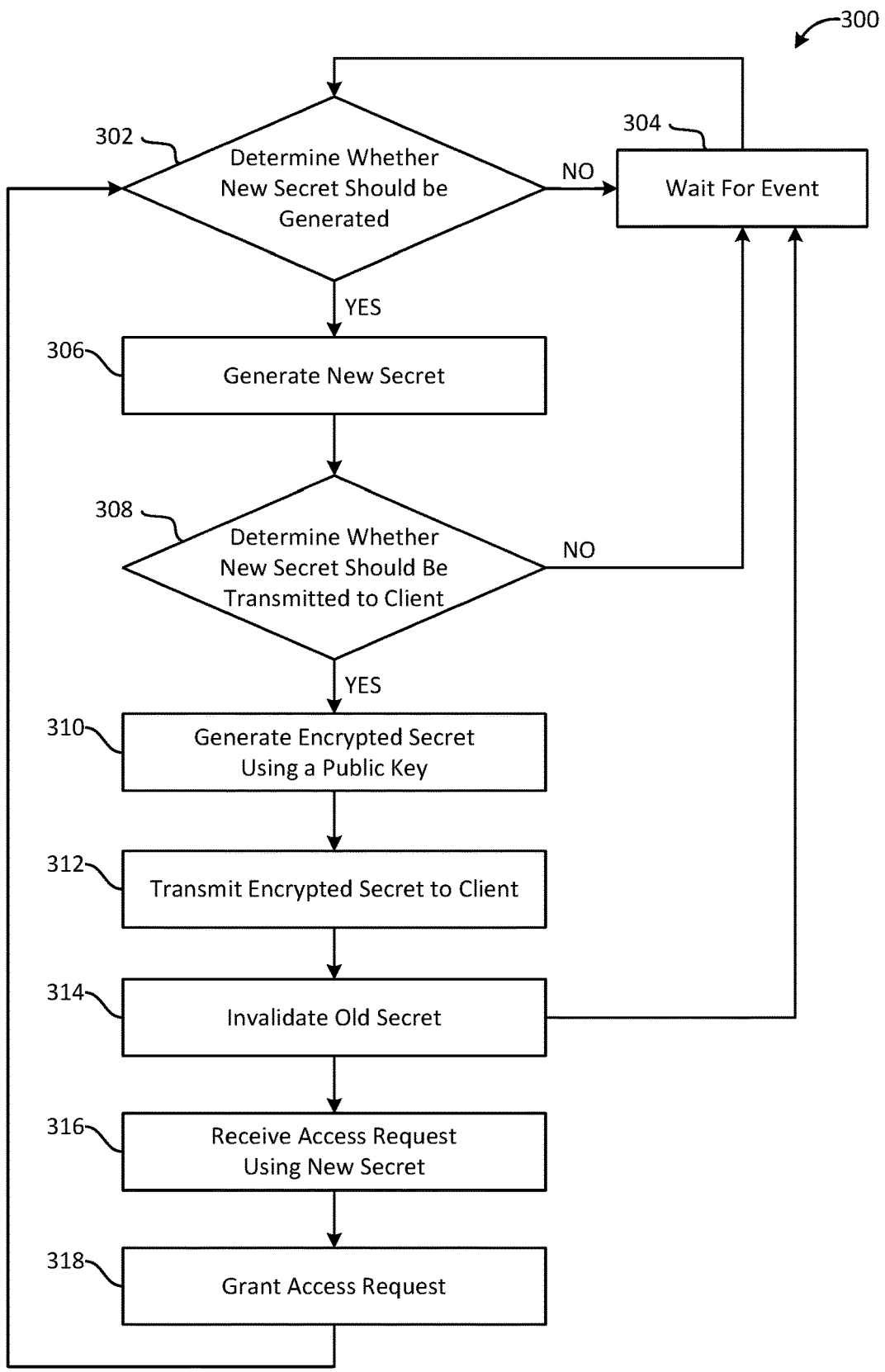
FIG. 3 illustrates an overview of an example method for generating a new secret.

FIG. 3 is an overview of an example method 300 for generating a new secret. Method 300 may be performed by a cloud computing service (e.g., service 102 in FIG. 1) or a tenant of a cloud computing platform, among others. Method 300 begins at determination operation 302, where a determination may be made whether a new secret should be generated. The determination may comprise determining whether a certain period of time has passed or whether an event has occurred. For example, the event may be a predetermined event, such as the addition of a new user account, receiving an access request using a previously transmitted secret, among others. If it is determined that a new secret should not be generated, flow branches NO to operation 304, where method 300 may wait for an event. The event may be periodic (e.g., hourly, daily, weekly, after six hours, etc.). In another example, the event may be a predetermined event, such as the events discussed above with respect to determination operation 302. Once an event occurs, flow returns to operation 302.

If, however, at determination operation 302, it is determined that a new secret should be generated, flow branches YES to operation 306, where a new secret is generated. The secret may be a password, a cryptographic key, or other type of credential used to perform authentication. In one example, generating the secret may comprise requesting a generated secret from another device, application, module, process, etc. Moving to determination operation 308, a determination may be made whether the new secret should be transmitted to a client. The determination may comprise evaluating one or more policies to determine whether a client should receive the newly-generated secret. The policies may relate to access control, security requirements, or attributes of the client (e.g., security claims stored when a user registration operation was performed, such as method 100 depicted in FIG. 1), among others. If it is determined that the new secret should not be transmitted to the client, flow branches NO to operation 304, which is discussed above.

If, however, it is determined that the new secret should be transmitted to the client, flow branches YES to operation 310, where an encrypted secret may be generated by encrypting the secret using a public key. The public key may be a public key stored as the result of a user registration operation. In some examples, generating the encrypted secret may comprise evaluating security claims associated with the public key, such as security claims relating to a cryptographic hardware device. The encrypted secret may comprise additional properties or metadata. The additional properties or metadata may include identifying information relating to the public key, such as a key fingerprint, a hash of the key or related information, or an identifier, among others. The additional information may be used by the client when decrypting the encrypted secret. In another example, the additional information may relate to authentication information, such as account credentials or identifying machine information, among others.

At operation 312, the encrypted secret may be transmitted to the client. Transmitting the secret may comprise accessing client information stored as a result of a user registration operation to determine a transmission method. As discussed above, the transmission method may be a secured or unsecured communication channel. As an example, the encrypted secret may be transmitted to a specified email address, uploaded to a specified file path on a network file server, or provided to a callback URL (e.g., using an HTTP POST request), among others.

Moving to operation 314, an old secret may be invalidated. The old secret may have been replaced by the newly-generated secret. As an example, the old secret may comprise an old password or old cryptographic key that may be invalidated in favor of the newly-generated secret comprising a new password or new cryptographic key. As a result, an access request may no longer be granted when using the old secret and the new secret must instead be used.

After operation 314, flow may branch to operation 304, where method 300 may wait for an event. This is discussed in greater detail above. In another example, flow may instead branch to operation 316, where an access request containing the new secret is received. Based on receipt of the new secret, access may be granted at operation 318. Granting access may comprise an additional determination, such as evaluating whether alternate authentication mechanisms are available or validating information relating to the requestor, among others. After operation 318, flow returns to determination operation 302, where it may be determined whether a new secret may be generated. While this is discussed in greater detail above, it may be determined, in some examples, that a new secret should be generated because the current secret was used in operation 316 to complete an authentication operation. As a result, flow may branch YES to operation 306. Alternatively, it may be determined that a new secret should not be generated, causing flow to branch NO to operation 304.

Figure 4:
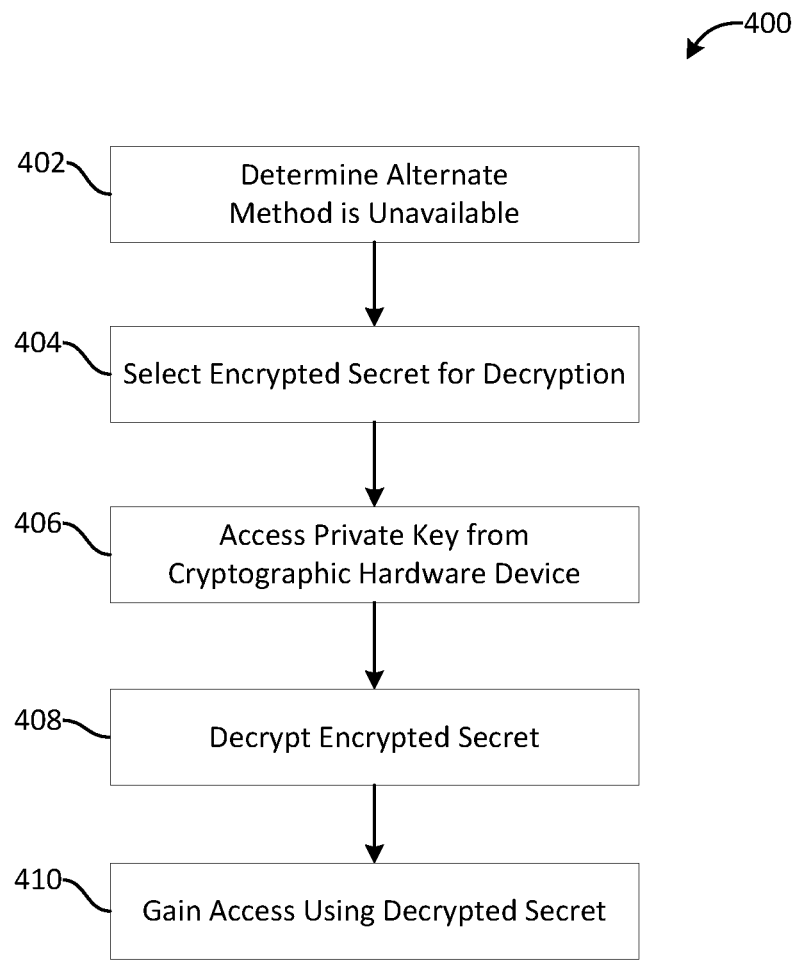
FIG. 4 illustrates an overview of an example method for accessing and using an offline secret.

FIG. 4 illustrates an overview of an example method 400 for accessing and using an offline secret. Method 400 may be performed by a client (e.g., client 106 in FIG. 1). In some examples, method 400 may be performed by one or more computing devices. Method 400 begins at operation 402, where it may be determined than an alternate authentication or administration method is unavailable (e.g., just-in-time privilege escalation, on-demand administrator account generation, etc.). The alternate authentication or administration method may be unavailable because of an emergency or failure scenario.

Moving to operation 404, an encrypted secret may be selected for decryption. Selecting the encrypted secret may comprise accessing information received by a transmission method. In some examples, the encrypted secret may have been received by a computing device other than the computing device performing method 400. In another example, the transmission method may have been specified during a user registration operation such as method 200 illustrated in FIG. 2. The transmission method may be email, such that selecting the encrypted secret may comprise checking an email mailbox for received messages. In another example, the encrypted secret may be stored by a network file server, wherein selecting the encrypted secret comprises accessing a file path on the network file server. In other examples, the encrypted secret may be stored by a server processing URL callback requests, wherein selecting the secret comprises accessing information stored by the server. One of skill in the art will appreciate that the encrypted secret may be stored using a variety of techniques without departing from the spirit of this disclosure. In some examples, there may be multiple encrypted secrets from which a selection may be made. The selection may be based on chronological order or additional information relating to the encrypted secrets (e.g., accessing a manifest relating to the encrypted secrets, processing one or more notifications indicating that an encrypted secret has been invalidated, etc.).

At operation 406, a private key may be accessed from a cryptographic hardware device. In an example, the selected encrypted secret may comprise metadata or properties that provide information relating to the cryptographic key used to encrypt the secret. As such, this information may be used to determine which cryptographic key or which cryptographic hardware device is required to decrypt the encrypted secret.

Moving to operation 408, the selected encrypted secret may be decrypted using the private key from the cryptographic hardware device. In some examples, the encrypted secret may be provided to the cryptographic hardware device, after which the cryptographic hardware device may provide an unencrypted secret in response. At operation 410, the decrypted secret may be used to gain access. In some examples, the decrypted secret may be used to gain access by a computing device other than the computing device that performed one or more of the operations described above. More specifically, one computing device may have selected (operation 404) and decrypted the encrypted secret using the cryptographic hardware device (operations 406-408), while another computing device may use the decrypted secret to gain access (operation 410). In another example, information stored within the encrypted secret relating to authentication may be retrieved to aid in gaining access to the service, such as retrieving account credentials or using identifying machine information to determine which computing device to access. Flow terminates at operation 410.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
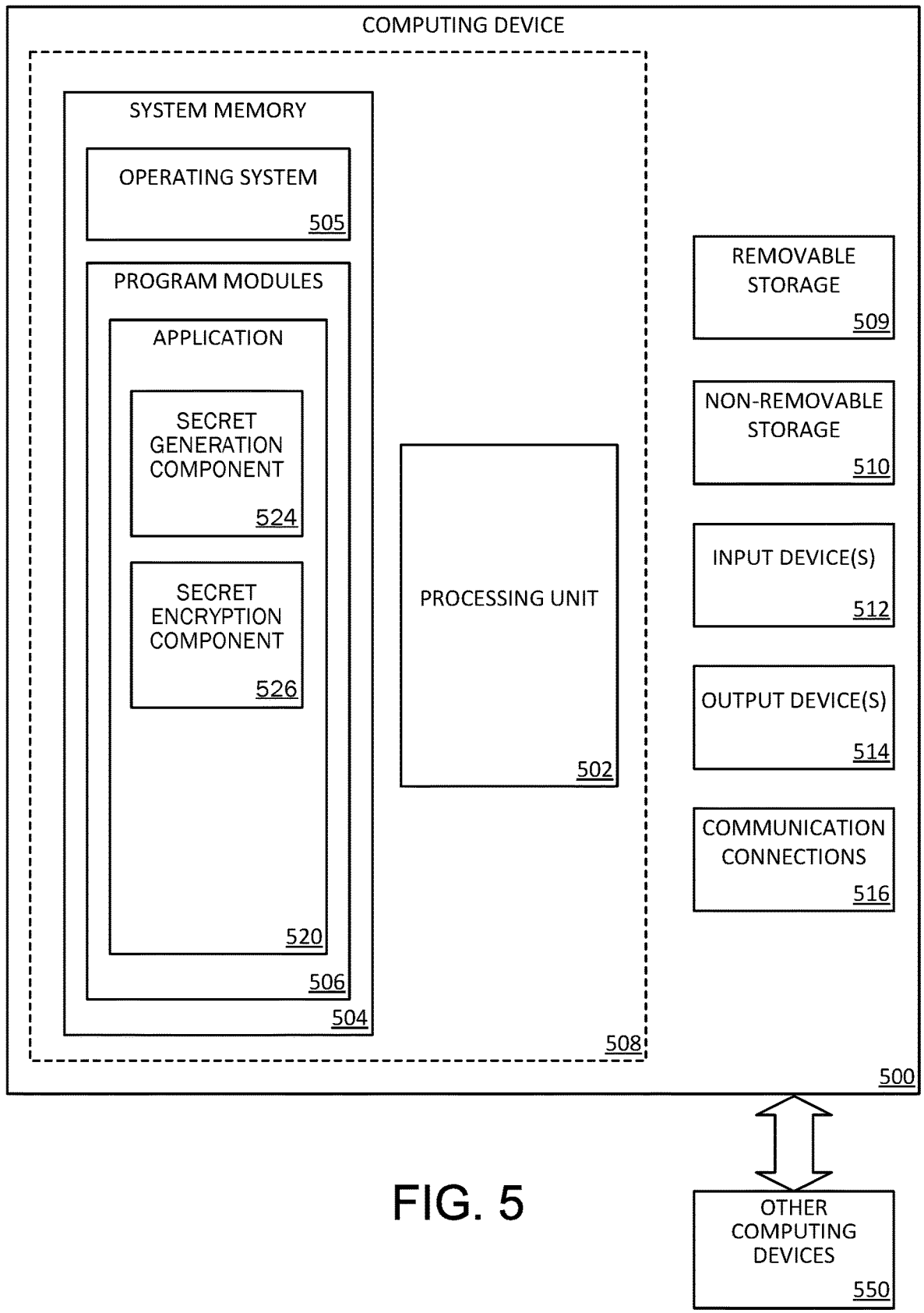
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as secret generation component 524 and secret encryption component 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
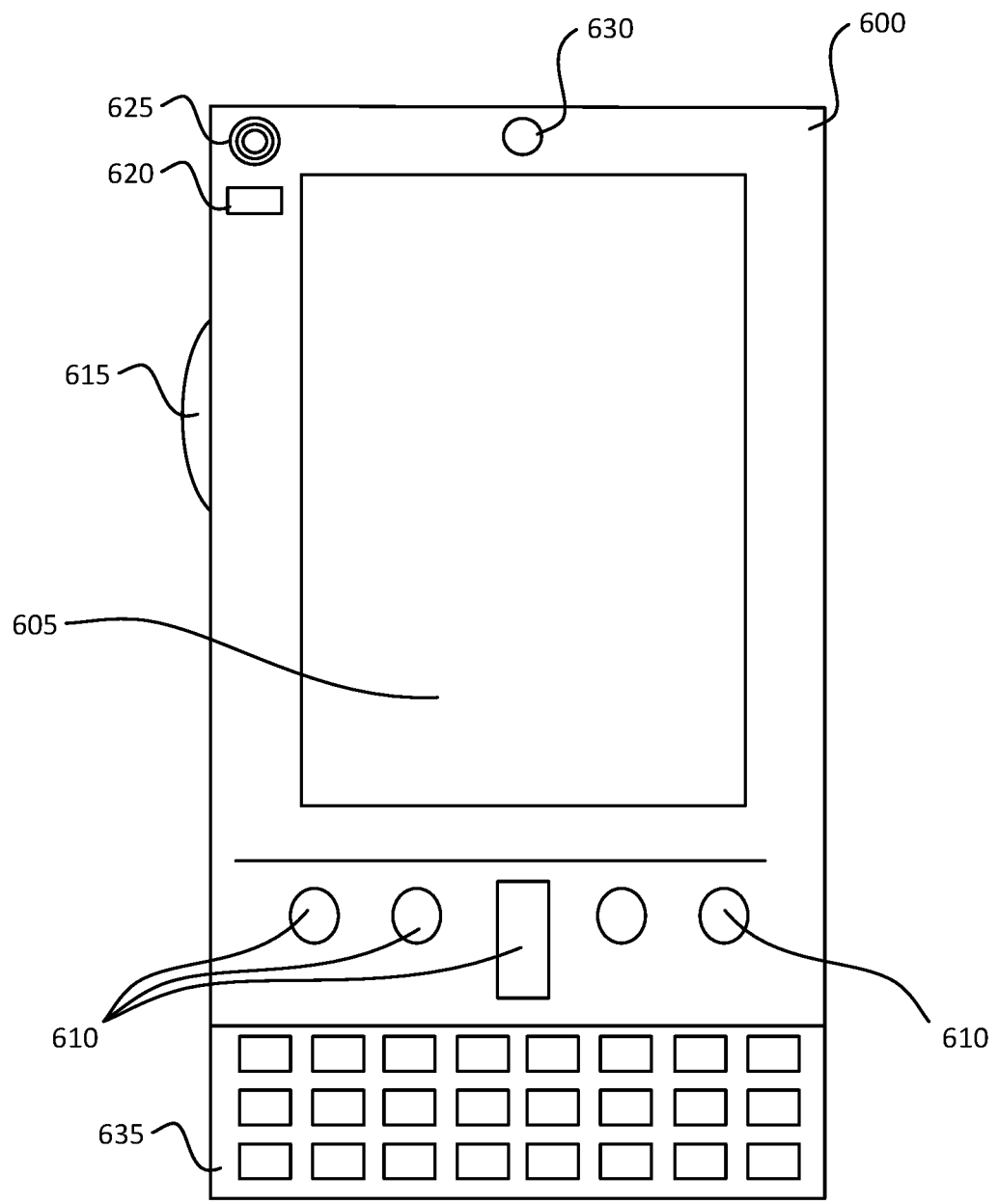
FIGS. 6A and 6B are simplified block diagrams of a mobile computing device with which aspects of the present disclosure may be practiced.
Figure 6B:
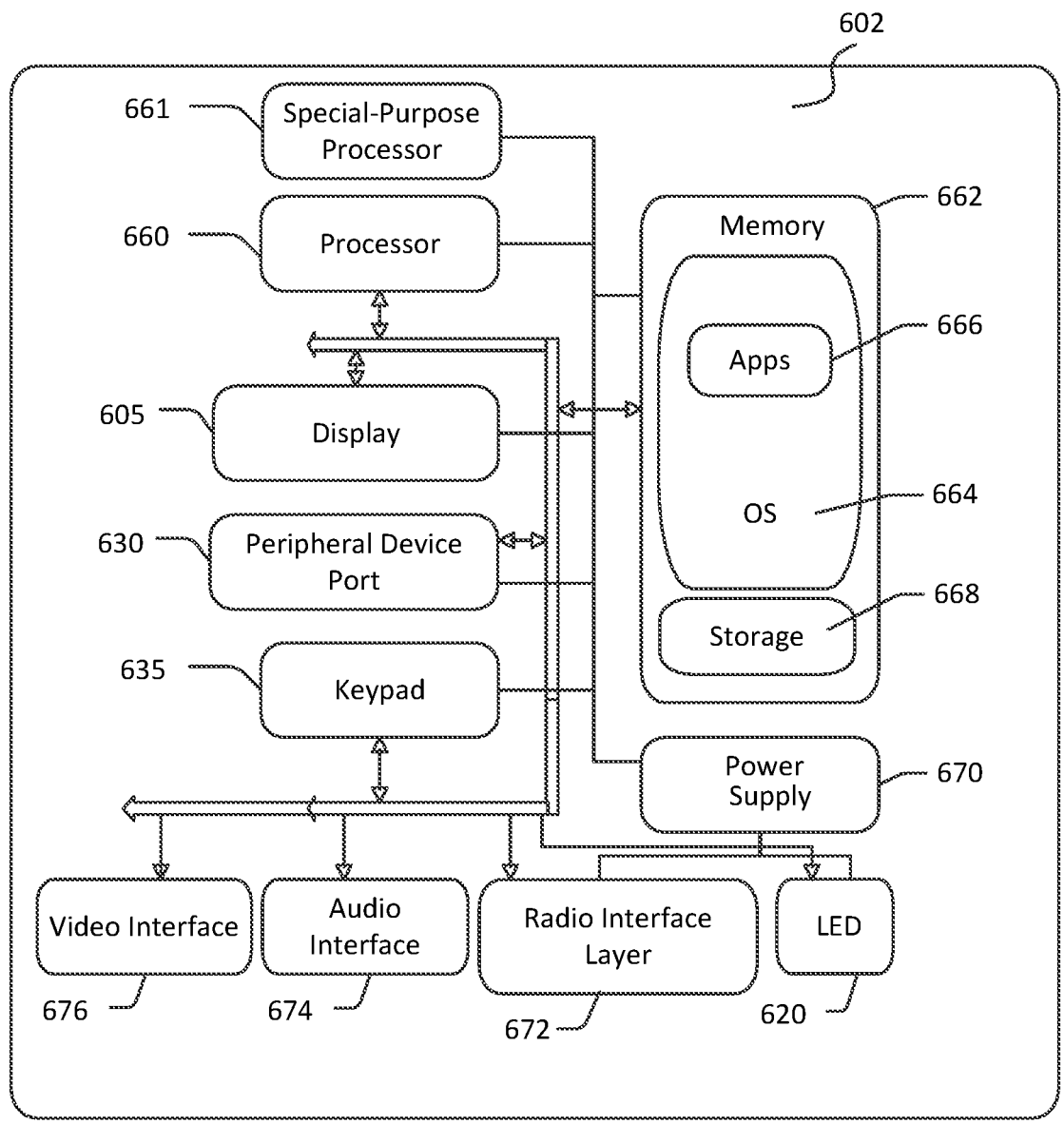

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
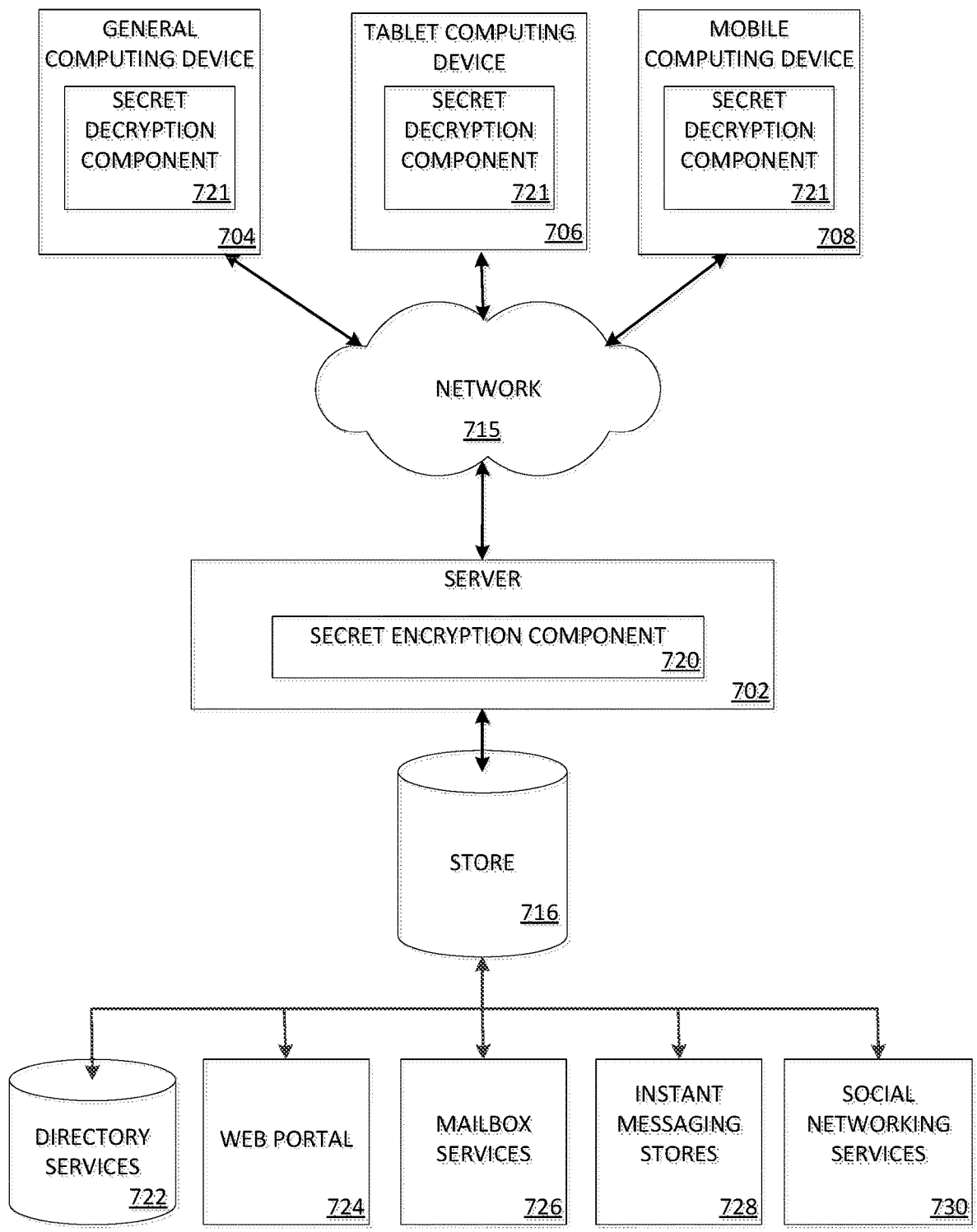
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Secret decryption component 721 may be employed by a client that communicates with server device 702, and/or secret encryption component 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
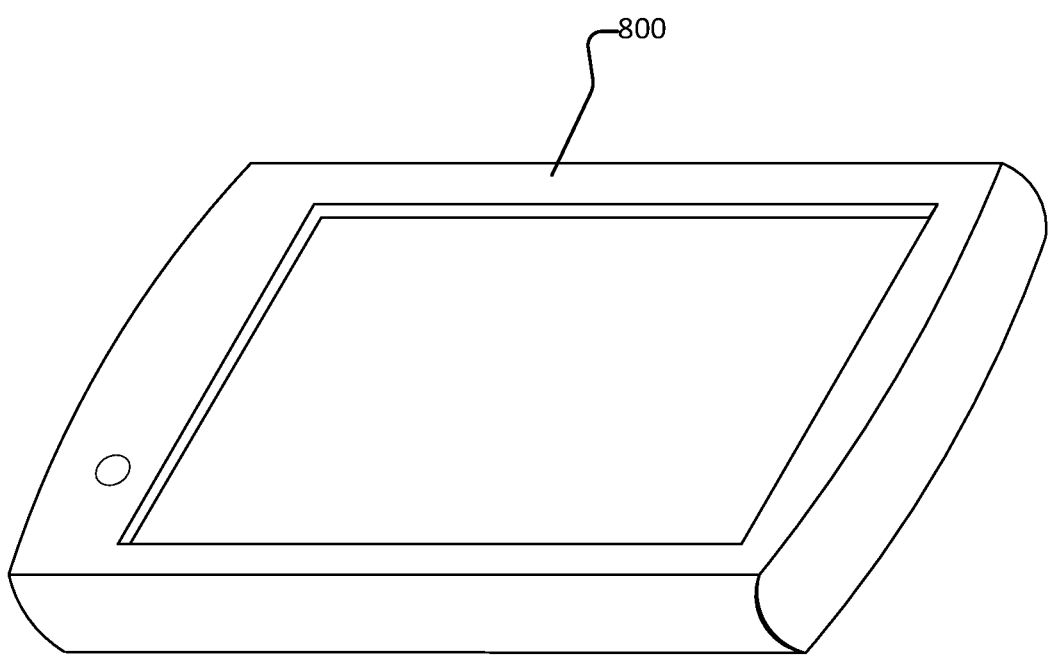
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, cause the system to perform a set of operations. The set of operations comprises: receiving a public key of a cryptographic key pair of a cryptographic hardware device and security claims relating to the cryptographic hardware device; validating, based on one or more policies, the security claims relating to the cryptographic hardware device; storing the public key, the security claims, and information relating to a client; determining a secret; generating, using the public key, an encrypted secret from the secret; and transmitting the encrypted secret to the client, wherein the encrypted secret may be decrypted using a private key of the cryptographic hardware device. In an example, the set of operations further comprises: determining, based on the one or more policies, whether a second secret should be transmitted to the client; based on determining that the second secret should be transmitted to the client, generating the second secret; generating, using the public key, a second encrypted secret from the second secret; and transmitting, based on the information relating to the client, the second encrypted secret to the client. In another example, the second secret is used in place of the determined secret to grant an access request by the client. In a further example, determining whether the second secret should be transmitted to the client occurs in response to the occurrence of a periodic event. In yet another example, secret is associated with a computing system and comprises at least one of a cryptographic key and a password. In a further still example, transmitting the encrypted secret to the client comprises transmitting the secret using an unencrypted communication channel. In another example, the information relating to the client comprises a transmission method indicated by the client.

In another aspect, the technology relates to a computer-implemented method. The method comprises: automatically generating a first secret; automatically generating a second secret, wherein the second secret is used in place of the first secret; determining, based on one or more policies, whether the second secret should be transmitted to a client; based on determining that the second secret should be transmitted to the client, accessing a public key associated with a cryptographic hardware device and information relating to the client; generating, using the public key, an encrypted secret from the second secret; transmitting, using an unencrypted communication channel and based on the information relating to the client, the encrypted secret to the client; invalidating the first secret; receiving a request for access using the second secret; and granting access based on the second secret. In an example, determining whether the second secret should be transmitted to the client comprises evaluating one or more security claims provided by the client relating to the cryptographic hardware device. In another example, the method further comprises: receiving a second request for access using the first secret; and denying access based on the invalidation of the first secret. In a further example, automatically generating the first secret occurs based on a user registration operation. In yet another example, automatically generating the second secret occurs based on a periodic event. In a further still example, the information relating to the client comprises a transmission method indicated by the client.

In a further aspect, the technology relates to a computer-implemented method. The method comprises: receiving a public key of a cryptographic key pair of a cryptographic hardware device and security claims relating to the cryptographic hardware device; validating, based on one or more policies, the security claims relating to the cryptographic hardware device; storing the public key, the security claims, and information relating to a client; determining a first secret; generating, using the public key, a first encrypted secret from the first secret; transmitting the first encrypted secret to the client, wherein the first encrypted secret may be decrypted using a private key of the cryptographic hardware device; automatically generating a second secret, wherein the second secret is used in place of the first secret; determining, based on the one or more policies, whether the second secret should be transmitted to the client; based on determining that the second secret should be transmitted to the client, accessing the public key associated with the cryptographic hardware device and information relating to the client; generating, using the public key, a second encrypted secret from the second secret; transmitting, using an unencrypted communication channel and based on the information relating to the client, the second encrypted secret to the client; invalidating the first secret; receiving a request for access using the second secret; and granting access based on the second secret. In an example, the method further comprises: receiving a second request for access using the first secret; and denying access based on the invalidation of the first secret. In another example, receiving the public key and the security claims occur based on a user registration operation. In a further example, determining whether the second secret should be transmitted to the client comprises evaluating one or more security claims provided by the client relating to the cryptographic hardware device. In yet another example, the first secret and the second secret are associated with a computing system and comprise at least one of a cryptographic key and a password. In a further still example, automatically generating the second secret occurs based on a periodic event. In another example, the information relating to the client comprises a transmission method indicated by the client.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, cause the system to perform a set of operations, the set of operations comprising:
   receiving, from a client, a public key of a cryptographic key pair of a cryptographic hardware device and a set of security claims for the cryptographic hardware device;
   validating, based on one or more policies, the set of security claims for the cryptographic hardware device to determine that protection offered by the cryptographic hardware device satisfies the one or more policies;
   storing the public key, the set of security claims, and information relating to the client;
   determining a secret;
   generating, using the public key, an encrypted secret from the secret; and
   transmitting the encrypted secret to the client, wherein the encrypted secret is decrypted using a private key of the cryptographic hardware device.

2. The system of claim 1, the set of operations further comprising:
   determining, based on the one or more policies, whether a second secret should be transmitted to the client;
   based on determining that the second secret should be transmitted to the client, generating the second secret;
   generating, using the public key, a second encrypted secret from the second secret; and
   transmitting, based on the information relating to the client, the second encrypted secret to the client.

3. The system of claim 2, wherein the second secret is used in place of the determined secret to grant an access request by the client.

4. The system of claim 2, wherein determining whether the second secret should be transmitted to the client occurs in response to an occurrence of a periodic event.

5. The system of claim 1, wherein the secret is associated with a computing system and comprises at least one of a cryptographic key and a password.

6. The system of claim 1, wherein transmitting the encrypted secret to the client comprises transmitting the secret using an unencrypted communication channel.

7. The system of claim 1, wherein the information relating to the client comprises a transmission method indicated by the client.

8. A computer-implemented method, the method comprising:
   automatically generating a first secret;
   automatically generating a second secret, wherein the second secret is used in place of the first secret;
   determining, based on one or more policies and a stored set of security claims for a cryptographic hardware device, whether the second secret should be transmitted to a client;
   based on determining that the second secret should be transmitted to the client, accessing a public key associated with the cryptographic hardware device and information relating to the client;
   generating, using the public key, an encrypted secret from the second secret;
   transmitting, using an unencrypted communication channel and based on the information relating to the client, the encrypted secret to the client;
   invalidating the first secret;
   receiving a request for access using the second secret; and
   granting access based on the second secret.

9. The method of claim 8, further comprising:
   receiving, from the client, the set of security claims relating to the cryptographic hardware device;
   determining whether the set of security claims satisfies the one or more policies; and
   based on determining the set of security claims satisfies the one or more policies, storing the security claims.

10. The method of claim 8, further comprising:
    receiving a second request for access using the first secret; and
    denying access based on the invalidation of the first secret.

11. The method of claim 8, wherein automatically generating the first secret occurs based on a user registration operation.

12. The method of claim 8, wherein automatically generating the second secret occurs based on a periodic event.

13. The method of claim 8, where the information relating to the client comprises a transmission method indicated by the client.

14. A computer-implemented method, the method comprising:
    receiving, from a client, a public key of a cryptographic key pair of a cryptographic hardware device and set of security claims for the cryptographic hardware device;
    validating, based on one or more policies, the set of security claims for the cryptographic hardware device to determine that protection of the cryptographic hardware device satisfies the one or more policies;
    storing the public key, the set of security claims, and information relating to the client;
    determining a first secret;
    generating, using the public key, a first encrypted secret from the first secret;
    transmitting the first encrypted secret to the client for decryption using a private key of the cryptographic hardware device;
    automatically generating a second secret, wherein the second secret is used in place of the first secret;
    determining, based on the one or more policies, whether the second secret should be transmitted to the client;
    based on determining that the second secret should be transmitted to the client, accessing the public key associated with the cryptographic hardware device and information relating to the client;
    generating, using the public key, a second encrypted secret from the second secret;
    transmitting, using an unencrypted communication channel and based on the information relating to the client, the second encrypted secret to the client;
    invalidating the first secret;
    receiving a request for access using the second secret; and
    granting access based on the second secret.

15. The method of claim 14, further comprising:
    receiving a second request for access using the first secret; and
    denying access based on the invalidation of the first secret.

16. The method of claim 14, wherein receiving the public key and the set of security claims occur based on a user registration operation.

17. The method of claim 14, wherein determining whether the second secret should be transmitted to the client comprises evaluating at least one security claim of the set of security claims provided by the client relating to the cryptographic hardware device.

18. The method of claim 14, wherein the first secret and the second secret are associated with a computing system and comprise at least one of a cryptographic key and a password.

19. The method of claim 14, wherein automatically generating the second secret occurs based on a periodic event.

20. The method of claim 14, wherein the information relating to the client comprises a transmission method indicated by the client.

* * * * *